June 12, 1928.  1,673,372
J. F. O'CONNOR
FRICTION SHOCK ABSORBING MECHANISM
Original Filed Nov. 16, 1925   2 Sheets-Sheet 2
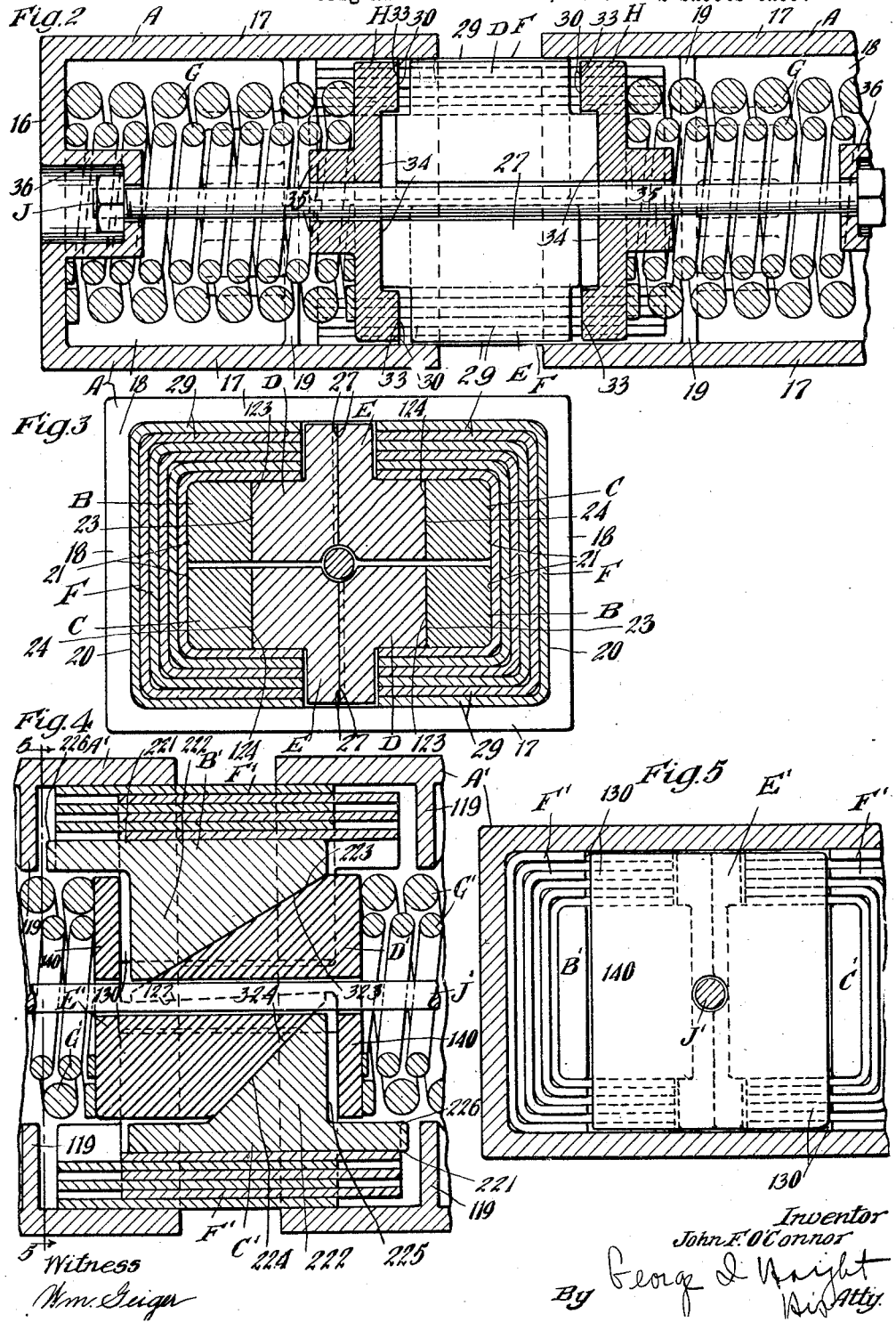

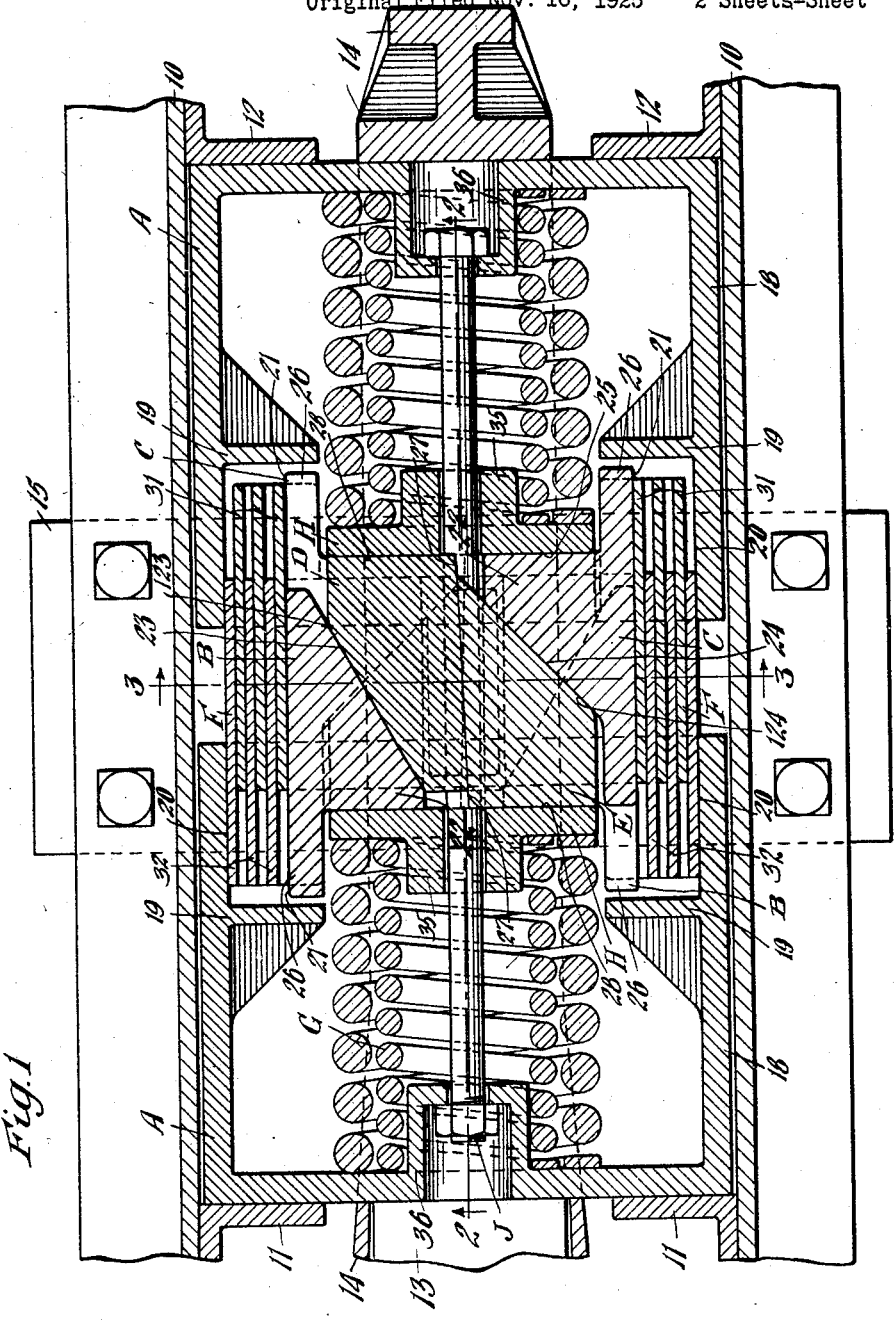

Patented June 12, 1928.

1,673,372

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed November 16, 1925, Serial No. 69,297. Renewed February 16, 1928.

This invention relates to improvements in friction shock absorbing mechanisms.

One object of the invention is to provide a friction shock absorbing mechanism more particularly adapted for railway draft riggings, wherein is obtained high capacity due to large frictional areas, together with assured release.

Another object of the invention is to provide a mechanism of the character indicated, employing a friction wedge system, including a plurality of elements having cooperating wedge faces, some of which are disposed at relatively keen wedge acting angles with respect to the longitudinal axis of the mechanism and others of which are disposed at relatively blunt angles to said axis to facilitate release, wherein the elements of the wedge system have co-operating friction surfaces disposed at an inclination to the longitudinal axis of the mechanism to provide for differential action during the compression of the mechanism Still another object of the invention is to provide a friction shock absorbing mechanism of the intercalated plate type, wherein are employed a plurality of intercalated friction plates co-operating with relatively movable friction shells, together with means for placing the plates under lateral pressure and wherein the spreading means is composed of a plurality of shoe and wedge elements and the wedge elements have interengaging, longitudinally disposed friction surfaces.

A further object of the invention is to provide a shock absorbing mechanism of the combined friction and spring type employing a plurality of intercalated relatively movable friction elements together with means for placing the elements under lateral pressure, wherein a preliminary mainly spring action is provided, followed by relatively light frictional resistance during which there is substantially no relative movement between the intercalated friction elements and a final heavier frictional resistance is had by effecting relative movement of said intercalated elements.

Other objects and advantages of the invention will more fully and clearly appear from the description and claims hereinafter following.

In the drawings forming a part of the specification, Figure 1 is a horizontal, longitudinal, sectional view of a portion of a railway draft rigging, showing my improvements in connection therewith. Figure 2 is a longitudinal, vertical, sectional view corresponding substantially to the line 2—2 of Figure 1. Figure 3 is a transverse, vertical, sectional view corresponding substantially to the line 3—3 of Figure 1. Figure 4 is a view similar to Figure 1, partly broken away, showing a different embodiment of the invention. And Figure 5 is a vertical, transverse, sectional view corresponding substantially to the line 5—5 of Figure 4.

Referring first to the embodiment of the invention illustrated in Figures 1, 2 and 3, 10—10 indicate channel-shaped center or draft sills of a railway car underframe to the inner faces of which are secured front stop lugs 11—11 and rear stop lugs 12—12. The inner end of the drawbar is designated by 13, to which is operatively connected a hooded cast yoke 14 of well known form. The shock absorbing mechanism proper is disposed in the yoke. The yoke and the parts therewithin are supported in operative position by a detachable saddle plate 15 secured to the draft sills.

The improved friction shock absorbing mechanism proper as shown in Figures 1, 2 and 3, comprise broadly, front and rear follower casings A—A; two friction shoes B—B; two friction shoes C—C; two wedge blocks D—D; two wedge blocks E—E; two groups of friction plates F—F; front and rear spring resistance elements G—G; front and rear spring followers H—H and a retainer bolt J.

The front and rear follower casings A are of substantially like design, each casing having a transverse end wall 16, horizontally disposed spaced top and bottom walls 17—17, and longitudinally disposed, vertical side walls 18—18. The end wall 16 of each casing co-operates with the corresponding stop lugs of the draft sills in the manner of the usual follower. The casings A are open at their inner ends as shown and the side walls are provided with vertically disposed flanges 19—19 outwardly of the inner ends of the casings. The flanges 19 of each casing are in transverse alignment and are preferably suitably reinforced by webs. Between the flange 19 and the outer end of the casing A, each side wall 18 of the casing presents a longitudinally disposed inner friction surface 20.

The friction shoes B—B and C—C are all of like construction, except as hereinafter pointed out. Each shoe has a longitudinally disposed outer friction surface 21 adapted to co-operate with the innermost friction plate of the corresponding group F. On the inner side, each shoe has an enlargement 22 having a wedge face on the inner side thereof, the wedge faces of the shoes B being designated by 23 and the wedge faces of the shoes C being designated by 24. At the outer end, the enlargement 22 presents a transverse abutment face 25 adapted to co-operate with the corresponding spring follower H. As clearly shown in the drawings, the main body portion of each shoe extends longitudinally outwardly beyond the abutment face 25 thereof, thereby presenting an arm 26 adapted to co-operate with the end of the flanges 19 of the corresponding friction casing. The wedge faces 23 of the shoes B are disposed at a relatively keen wedge acting angle with reference to the longitudinal axis of the mechanism, while the wedge faces 24 of the shoes C are disposed at a relatively blunt releasing angle with respect to said axis. The wedge shoes are arranged in sets at opposite sides of the mechanism, each set comprising a keen angled wedge shoe B and a blunt angle wedge shoe C, the keen shoe at one side of the mechanism being disposed above the corresponding blunt shoe, and the blunt shoe on the other side of the mechanism being disposed above the keen shoe.

The wedge blocks which are four in number, are also all of substantially like design, except as hereinafter pointed out. Each wedge block has an outer wedge face adapted to co-operate with the wedge face of one of the friction shoes, the wedge faces of the wedge blocks D being designated by 123 and the wedge faces of the wedge blocks E being designated by 124. Each wedge block D has the faces 123 thereof correspondingly inclined to and adapted to co-operate with the faces 23 of one of the friction shoes B, and each wedge block C has the face 124 thereof correspondingly inclined to and adapted to co-operate with the face 24 of one of the friction shoes C. The wedge blocks D and E are arranged in sets, one set being disposed above the other as most clearly shown in Figures 1 and 3. Each wedge block has a longitudinally disposed friction surface 27 at the inner side thereof adapted to co-operate with a similar face 27 on the adjacent block of the corresponding set. The co-operating friction surfaces 27 of each set of wedge blocks D and E are slightly inclined with reference to the longitudinal axis of the mechanism. As shown in Figure 1, the co-operating faces 27 of the upper set of wedge blocks are so inclined that there will be a tendency to force the blocks apart when the block D is moved rearward with reference to the block E and the cooperating faces 27 of the lower set of blocks are inclined in the reverse direction so that the latter will be spread apart when the lower block B is moved rearwardly with reference to the corresponding block E. As most clearly shown in Figure 1, the two shoes B have the arms 26 thereof presented forwardly while the shoes C have their arms 26 presented rearwardly. A slight clearance is left between the outer ends of the arms 26 of the shoes and the flanges 19 of the casings A, in the normal full release position of the parts, to provide for a certain amount of preliminary spring action of the mechanism before the shoes are actually forced inwardly with reference to the wedge blocks. The wedge blocks D have flat transverse faces 28 at their rear ends adapted to bear on the corresponding spring follower H. And the wedge blocks E are provided with similar transverse flat faces 28 at their front ends adapted to co-operate with the front spring follower H.

The friction plates F are arranged in two groups at opposite sides of the mechanism. The groups of plates are all of like design, each plate being in the form of a channel member, as most clearly shown in Figure 3. The horizontal top and bottom sections of each channel-shaped plate are cut away at the opposite ends as most clearly shown in Figure 2, thereby leaving top and bottom lateral enlargements 29 presenting transverse front and rear shoulders 30 adapted to co-operate with the corresponding spring follower H in a manner hereinafter pointed out to effect restoration of the plates to normal position. Each group is composed of six plates as shown in Figure 1 of the drawing, there being three plates 31 and three plates 32, the plates 31 being intercalated with the plates 32. The plates of each group are so arranged that one of the plates 32 is disposed outermost and co-operates with the corresponding friction surfaces 20 of the front and rear casings A and one of the plates 31 of said group is disposed innermost and co-operates with the friction surfaces 22 of the adjacent shoes B and C. As most clearly indicated in Figure 1, the plates 32 have their front ends and the plates 31 have their rear ends normally slightly spaced from the corresponding flanges 19 of the front and rear follower casings A in the normal full release position of the parts. The spacing between these ends of the plates and the flanges 19 is preferably greater than the space between the outer ends of the arms 26 of the shoes B and C and flanges 19. It will thus be seen that during relative movement of the casings A upon compression of the mechanism, the shoes will be engaged and moved before there is any actual relative movement of the friction plates of the two groups.

The spring followers H which are two in number, are disposed at opposite ends of the friction wedge system comprising the shoes B and C and the wedge blocks D and E. Each spring follower H is preferably in the form of a substantially rectangular plate centrally cut away on the inner side as most clearly shown in Figure 2, thereby providing inwardly offset abutment faces 33 at the top and bottom thereof adapted to cooperate with the abutment faces 30 of the top and bottom groups of friction plates F. Between the abutment faces 33, each spring follower H presents a transverse flat abutment face 34 bearing on the corresponding end faces 28—28 of the adjacent set of wedge blocks.

The spring resistance elements G which are arranged at opposite ends of the mechanism, each comprise a relatively light inner coil and a heavier outer coil, the inner coil of each unit G being held in central position by bosses 35 and 36 inwardly projecting from the corresponding spring follower H and the end wall 16 of the corresponding casing A. The opposite ends of each spring unit bear directly on the end wall 16 and the outer face of the spring follower H at the corresponding end of the mechanism.

The mechanism is held of overall uniform length and in assembled relation by the retainer bolt J, which has its front and rear ends anchored respectively in the bosses 36 of the front and rear follower casings A. The retainer bolt in addition to holding the parts assembled also serves to maintain the mechanism under a predetermined initial compression. Compensation for wear of the various friction and wedge faces is had by the expansion of the spring resistance elements G, which as pointed out are under initial compression. To permit for the relative movement of the parts to compensate for wear of these faces, clearance is left between the front spring follower H and the front ends of the keen angled wedges D and between the rear spring follower H and the rear ends of the blunt angled wedge blocks E.

The operation of my improved shock absorbing mechanism, assuming a compression stroke, is as follows: The front and rear follower casings A will be moved relatively toward each other, first compressing the spring resistance elements G. Upon further relative approach of the front and rear casings A, the flanges 19 thereof will come in engagement with the outer ends of the arm 26 of the friction shoes, whereupon the shoes B will be forced rearwardly against the wedge blocks D and the shoes C will be forced against the wedge blocks E. A wedging action will thus be set up between the keen faced shoes B and the keen faced wedges D, thereby expanding the friction wedge unit and placing the plates of the two groups under lateral pressure and forcing the same against the friction surfaces of the front and rear casings A. During further compression of the mechanism, the shoes will carry the wedge blocks therewith, causing relative longitudinal movement between the wedge members D and E of each set, the latter slipping on their cooperating friction surfaces 27. Due to the inclination of the friction surfaces 27, with reference to the longitudinal axis of the mechanism, a differential action will be effected, thereby causing a more rapid movement of the wedges than the shoes and further compression of the main spring resistance elements G. This action will continue until the front ends of the friction plates 32 and the rear ends of the friction plates 31 come into engagement with the flanges 19 of the corresponding front and rear casings A, whereupon the friction plates will be moved relatively to each other, thereby greatly augmenting the frictional resistance offered. The casings A will be moved relatively toward each other, either until the actuating force is reduced or the inner ends of the casings come into abutment, whereupon further compression of the main springs will be limited and the actuating force transmitted directly through the casings to the corresponding stop lugs. When the actuating force is reduced, the springs G will effect restoration of all the plates to normal position. The spring followers H will be forced inwardly by the springs, carrying the wedge blocks and friction shoes back to normal position. During their relative approach on release, the spring followers will not initially engage the lateral enlargements on the friction plates inasmuch as spring followers are moved away from the abutment faces 30 on the lateral enlargements of the plates during the early compression of the mechanism until the clearance between the plates and the flanges 19 of the casings A is taken up and the plates are moved relatively to each other. There will be an additional spacing between the enlargements on the plates and the spring followers H during compression of the mechanism due to the differential action of the wedging system, the friction wedge system being thereby elongated longitudinally. Due to the relatively blunt co-operating faces on the wedge blocks and the friction shoes, the wedge blocks will be squeezed out from between the shoes during release of the mechanism, thereby relieving the pressure on the co-operating keen wedge faces and greatly facilitating the releasing operation.

In addition to facilitating release of the mechanism, the blunt and keen angle arrangement of co-acting wedge faces also effectively prevents the sticking of the elements of the wedge system due to the fact that the blunt faces act in the manner of a "safety valve".

Referring next to the embodiment of the invention illustrated in Figures 4 and 5, the improved shock absorbing mechanism comprises broadly, front and rear follower casings A'—A'; two friction shoes B'—C'; two wedge blocks D' and E'; two groups of friction plates F'—F'; front and rear spring resistance elements G'—G'; and a retainer bolt J'.

The casings A' and A', the two groups of friction plates F'—F', the front and rear spring resistance elements G'—G' and the retainer bolt J' are of identically the same construction as the corresponding elements hereinbefore described in connection with the form of the invention illustrated in Figures 1, 2 and 3. In this instance, the friction wedge system comprises only four elements, two friction shoes B' and C' and two wedge blocks D' and E'. The friction shoes B' and C' are of identical construction except as hereinafter pointed out. Each friction shoe has a longitudinally disposed outer friction surface 221 adapted to co-operate with the innermost friction plate of one of the groups. On the inner side, each shoe has a lateral enlargement 222 provided with a wedge face adapted to co-operate with the corresponding wedge block, the wedge faces on the shoe B' being designated by 223 and the wedge face on the shoe C' being designated by 224. As clearly shown in Figure 4, the wedge face 223 is disposed at a relatively keen wedge acting angle with reference to the longitudinal axis of the mechanism while the face 224 of the shoe C' is disposed at a relatively blunt releasing angle with respect to said axis. The enlargement 222 of the shoe B' presents a flat abutment face 225 at the forward end thereof and the enlargement 222 of the shoe C' presents a similar face 225 at the rear end thereof. The main body portion of each shoe is extended outwardly beyond the corresponding face 225 of the enlargement thereof, thereby presenting arms 226. The arm 226 of the shoe B' extends forwardly while the arm 226 of the shoe C' extends rearwardly and both of these arms have their outer ends normally slightly spaced from the corresponding flanges 119 of the front and rear follower casings.

The wedge blocks D' and E' which are interposed between the shoes B' and C' are of like construction except as hereinafter pointed out. Each block has a wedge face on the outer side thereof, the wedge face of the block D' being designated by 323 and the wedge face of the block E by 324. The face 323 of the block D' is correspondingly inclined to and adapted to co-operate with the face 223 of the friction shoe B' when the face 324 of the wedge block E' is correspondingly inclined to and is adapted to co-operate with the face 224 of the friction shoe C'. On the inner side, each shoe has a longitudinally disposed friction surface 127 bearing on the corresponding face 127 of the other block. As clearly shown in Figure 4, the co-operating faces 127 are slightly inclined with reference to the longitudinal axis of the mechanism, the same being so disposed that the wedge members D' and E' will be forced apart when the former is carried rearwardly with reference to the latter.

Each wedge block is also provided with a lateral flange 140 adapted to overhang the enlargement of the wedge friction shoe at the opposite side of the mechanism. As most clearly shown in Figure 4, a certain amount of clearance is left between the flanges 140 and the faces 225 of the friction shoes, thus permitting a certain amount of relative movement between these parts to compensate for wear of the various friction and wedge faces of the mechanism. The spring resistance elements G' bear directly on the outer sides of the flanges 140 of the wedge members and the flanges are adapted to engage with shoulders 130—130 provided at the opposite ends of enlargements on the horizontal sections of the friction plates F'. The mechanism is held under initial compression and in assembled relation by the retainer bolt J' in precisely the same manner as described in connection with the embodiment of the invention illustrated in Figures 1, 2 and 3. The operation of the embodiment of the invention illustrated in Figures 4 and 5 is in all respects similar to that herein described in connection with the other embodiment of the invention with the exception that the friction shoe B' on one side of the mechanism is engaged by the flange 119 on the front follower casing when the shoe C' is engaged by the flange 119 of the rear follower casing A. During the compression of the mechanism, the shoes B' and C' are moved relatively to each other, thereby setting up a wedging action between the keen faces of the shoe B and the wedge block D' and carrying the latter rearward relatively to the wedge block E'. A differential action will thus be had between the wedge blocks D' and E' similar to that hereinbefore described, thereby effecting an additional compression of the main spring resistance elements G'. The compression of the mechanism illustrated in Figures 4 and 5 will be in three stages similar to that hereinbefore described in connection with the first form of the invention. During the first stage, the main springs G' will be compressed, then during the second stage the shoes B' and C' and the wedge blocks D' and E' will be moved relatively to each other. This action will continue until the front and rear ends of the plates are engaged by the flanges 119 of the front and rear casings A', whereupon during the last stage of the operation, the plates will be moved relatively to each other. The restoration of the parts to normal position during release is in all respects similar to that hereinbefore described, with the exception that the flanges 140 of the wedge members D' and E' effect restoration of the friction plates instead of the same being restored by the spring followers H.

From the preceding description taken in connection with the drawings, it will be evident that I have provided a highly efficient friction shock absorbing mechanism, wherein three progressively increasing stages of resistance are had, first a limited amount of mainly spring action, then a combined spring and frictional resistance during which the friction plates have no substantial relative movement and finally a very high frictional resistance during which the friction plates are moved relatively to each other. In addition to the resistance thus offered, there is also an additional compression of the main spring resistance elements on account of the differential action between the wedge members.

It will be evident that my invention is not limited to the arrangement of blunt and keen wedge faces hereinbefore described, but that it is within the scope of the invention to dispose all of the wedge faces at the same angle with reference to the longitudinal axis of the mechanism.

While I have herein shown and described what I now consider the preferred manner of carrying out my invention, the same is merely illustrative, and I contemplate all changes and modifications that come within the scope of the claims appended hereto.

I claim:

1. In a friction shock absorbing mechanism, the combination with front and rear follower elements having longitudinally disposed friction surfaces, said follower elements being relatively movable toward and away from each other; of a friction system co-operating with said elements, said system including friction shoes and wedge elements co-operating with said shoes, said shoes and wedge elements having co-acting wedge faces, said wedge elements being relatively movable lengthwise of the mechanism and having inter-engaging faces extending longitudinally of the mechanism and inclined with reference to the longitudinal axis of the mechanism, said shoes being adapted to be engaged by said followers and moved in unison therewith thereby relatively to each other and effect movement of said wedges relatively to each other longitudinally of the mechanism on said interengaging inclined faces; and spring resistance means interposed between the friction system and each follower.

2. In a friction shock absorbing mechanism, the combination with front and rear relatively movable friction members having longitudinally disposed friction surfaces; of a friction system co-operating with said members, said system including friction shoes adapted to be engaged respectively by said members and moved relatively to each other, longitudinally of the mechanism in unison with said members after engagement thereof, and wedge elements having wedging engagement with the shoes, said wedge elements having inter-engaging surfaces inclined with respect to the longitudinal axis of the mechanism; and cushioning means resisting movement of said wedge elements and members.

3. In a friction shock absorbing mechanism, the combination with front and rear, relatively movable friction shells, having interior friction surfaces; of a friction system co-operating with said shells, said system including friction shoes adapted to be engaged respectively by said shells and moved in unison therewith when so engaged to effect relative movement of the shoes with respect to each other; and wedge elements co-operating with said shoes, said wedge elements having inter-engaging faces inclined with respect to the longitudinal axis of the mechanism; and spring resistance elements interposed between said wedge elements and friction shells.

4. In a friction shock absorbing mechanism, the combination with front and rear follower elements relatively movable toward and away from each other; of a friction system co-operating with said follower elements, said system including a friction shoe, co-operating with each follower, each of said shoes being engaged by one of said follower elements and moved thereby in unison therewith, and a wedge element co-operating with each shoe, said wedge elements having inter-engaging friction surfaces and being relatively movable to each other; and spring resistance means interposed between said friction system and follower elements.

5. In a friction shock absorbing mechanism, the combination with front and rear follower members relatively movable toward and away from each other, said means having longitudinally disposed surfaces; of a friction system co-operating with said members, said system including wedge elements and friction shoes, said shoes having wedging engagement with said elements on cooperating sets of engaging wedge faces, certain of said enaging faces being disposed at a relatively keen wedge acting angle with reference to the longitudinal axis of the mechanism and the remaining enaging faces being disposed at relatively blunt releasing angles with reference to said axis, said wedge elements having co-operating friction surfaces inclined with respect to the longitudinal axis of the mechanism; and a spring resistance element interposed between said friction system and each follower member.

6. In a friction shock absorbing mechanism, the combination with front and rear relatively movable friction shells having interior friction surfaces; of a friction system co-operating with said shells, said system including a friction shoe adapted to be engaged by each shell and moved thereby, and a wedge member co-operating with each shoe, the shoe engaged by one shell and the wedge member co-operating therewith having engaging faces disposed at a relatively keen wedge acting angle with respect to the longitudinal axis of the mechanism and the shoe engaged by the other shell and the wedge member co-operating therewith having the engaging faces disposed at a relatively blunt releasing angle with respect to said axis, said wedge members having inter-engaging friction surfaces slightly inclined with respect to the longitudinal axis of the mechanism; and means yieldingly resisting movement of said wedge members and friction shells.

7. In a friction shock absorbing mechanism, the combination with front and rear followers having longitudinally disposed friction surfaces, said followers being relatively movable toward and away from each other; of a plurality of relatively movable, intercalated friction plates co-operating with said follower friction surfaces and adapted to be engaged thereby and moved relatively to each other; means for placing said plates under lateral pressure, including friction shoes engaging the plates and wedge members co-operating with said shoes, said wedge members having interengaging friction surfaces disposed longitudinally of the mechanism; and spring resistance elements opposing movement of said wedge members and followers.

8. In a friction shock absorbing mechanism, the combination with front and rear relatively movable followers, said followers having longitudinally disposed friction surfaces; of a plurality of intercalated friction elements adapted to be engaged by said followers and moved relatively to each other after a predetermined initial compression of the mechanism; means for placing said elements under lateral pressure, including friction shoes adapted to be engaged and moved relatively to each other by said followers, and wedge members co-operating with said shoes, said wedge members having inter-engaging friction surfaces; and a spring resistance element interposed between said wedge members and followers.

9. In a friction shock absorbing mechanism, the combination with a pair of relatively movable friction shells, said shells having interior friction surfaces; of a friction system co-operating with said shells, said system including a plurality of friction shoes and a wedge member co-operating with each shoe, said wedge members having inter-engaging friction surfaces, said shoes being adapted to be engaged by the shells and moved relatively to each other after a predetermined compression of the mechanism; and spring resistance means interposed between the friction system and each shell.

10. In a friction shock absorbing mechanism, the combination with front and rear relatively movable friction shells; of a plurality of intercalated, relatively movable friction elements co-operating with the shells, said elements being adapted for engagement by the shells to be moved relatively to each other, said elements being divided into two groups disposed at opposite sides of the mechanism; spreading means interposed between said two groups of elements, said means including friction shoes adapted to be moved thereby and wedge members engaging said shoes, said shoes cooperating respectively with said two groups of friction elements and said wedge members having inter-engaging friction surfaces disposed longitudinally of the mechanism, and spring resistance elements interposed between said spreading means and front and rear shells.

11. In a friction shock absorbing mechanism, the combination with front and rear friction shells having abutment means thereon, said shells being relatively movable toward and away from each other, said shells having interior friction surfaces; of a plurality of relatively movable intercalated friction plates co-operating with the friction surfaces of the shells, said plates being adapted to be engaged by the abutment means of the shells and moved relatively to each other after a predetermined compression of the mechanism, said plates being divided into two groups at opposite sides of the mechanism; spreading means interposed between said groups of plates, said spreading means including friction shoes and wedge elements co-operating with the shoes, each shoe having frictional engagement with one of said groups of plates, said shoes being adapted to be engaged and moved by said shells after a predetermined relative movement of said shells, prior to engagement by the abutment means of the plates of said shells, said wedge elements having inter-engaging friction surfaces disposed longitudinally of the mechanism; and means yieldingly resisting movement of the shells and wedge elements.

12. In a friction shock absorbing mechanism, the combination with a pair of friction shells relatively movable toward and away from each other, said shells having interior friction surfaces; of a plurality of intercalated friction elements, said elements being divided into two groups at opposite sides of the mechanism, said groups co-operating with the friction surfaces of the shells, and the elements composing each group being adapted to be engaged by the shells and moved relatively to each other; spreading means interposed between said two groups of elements, said means including wedge elements and friction shoes, said shoes and wedge elements having co-operating sets of engaging wedge faces, certain of said engaging faces being disposed at a relatively keen wedge acting angle with reference to the longitudinal axis of the mechanism; and the remaining engaging faces being disposed at relatively blunt releasing angles with respect to said axis, said wedge elements having co-operating friction surfaces inclined with respect to the longitudinal axis of the mechanism; and a spring resistance element interposed between said spreading means and each friction shell.

13. In a friction shock absorbing mechanism, the combination with front and rear friction shells having interior friction surfaces, said shells being relatively movable toward and away from each other; of a plurality of friction plates co-operating with said shell friction surfaces, said plates being arranged in two spaced groups and each group comprising two sets of plates, the plates of said two sets being intercalated and the two sets of plates of each group being adapted to be engaged by the front and rear friction shells respectively and moved relatively to each other upon approach of said shells; spreading means interposed between said two groups of plates, said means including a plurality of elements, certain of which have frictional engagement with the plates and the remainder of which have frictional engagement with each other along surfaces disposed longitudinally of the mechanism, said first named elements having co-operating wedge faces; and spring resistance means interposed between said spreading means and the front and rear friction shells.

14. In a friction shock absorbing mechanism, the combination with front and rear friction shells having interior friction surfaces, said shells being relatively movable toward and away from each other; of a plurality of friction plates co-operating with said shell friction surfaces, said plates being arranged in two spaced groups and each group comprising two sets of plates, the plates of said two sets being intercalated, the two sets of plates of each group being adapted to be engaged by the front and rear friction shells respectively and moved relatively to each other, upon approach of said shells; means interposed between said two groups of plates, placing the same under lateral pressure, said means including a friction shoe movable with each shell co-operating with one of said groups of plates; and a wedge member cooperating with each shoe, each of said wedge members having wedging engagement with one of said shoes, said wedge members having inter-engaging friction surfaces disposed longitudinally of the mechanism; means for yieldingly resisting movement of said wedge members and shells; and means movable with said wedge means for engaging the plates to restore the same to normal position.

15. In a friction shock absorbing mechanism, the combination with front and rear friction shells having interior friction surfaces, said shells being relatively movable toward and away from each other; of a plurality of friction plates co-operating with said shell friction surfaces, said plates being arranged in two spaced groups, and each group comprising two sets of plates, the plates of said two sets being intercalated, the two sets of plates of each group being adapted to be engaged by the front and rear friction shells respectively and moved relatively to each other upon approach of said shells; means interposed between said two groups of plates for placing the same under lateral pressure, said means including two pairs of friction shoes and two sets of wedges, one pair of shoes being adapted to be engaged and moved by one of said shells and the other pair being adapted to be engaged and moved by the other shell, each set of wedges having inter-engaging friction surfaces inclined with respect to the longitudinal axis of the mechanism, and the wedges of each set having wedging engagement respectively with one of the shoes of the pair movable with one shell and one of the shoes of the pair movable with the other shell; and spring resistance elements interposed between said means for placing the plates under lateral pressure and the front and rear friction shells.

16. In a friction shock absorbing mechanism, the combination with front and rear friction shells having interior friction surfaces, said shells being relatively movable toward and away from each other; of a plurality of friction plates co-operating with said shell friction surfaces, said plates being arranged in two spaced groups and each group comprising two sets of plates, the plates of two sets being intercalated, the two sets of plates of each group being adapted to be engaged by the front and rear friction shells respectively and moved relatively to each other upon approach of said shells; means interposed between said two groups of plates for placing the same under lateral pressure, said means including two friction shoes co-operating with each group of plates and a wedge member co-operating with each shoe; one of the shoes co-operating with each group of plates being adapted to be engaged by and moved with the front shell and the other shoe co-operating with said group being adapted to be engaged by and moved with the rear friction shell, and the wedge members co-operating with said last named shoes and the wedge means co-operating with the remaining shoes having inter-engaging friction surfaces slightly inclined with respect to the longitudinal axis of the mechanism; and means for yieldingly resisting movement of said wedges and shells.

17. In a friction shock absorbing mechanism, the combination with front and rear friction shells having interior friction surfaces; of a friction system co-operating with the friction surfaces of the shells, said system including two sets of friction shoes disposed at opposite sides of the mechanism, one of the shoes of each set being adapted to be engaged and moved by one of the friction shells and the other shoe of each set being adapted to be engaged by and moved with the other shell, and a wedge member co-operating with each shoe, one of the shoes and the wedge member co-operating therewith having wedge faces disposed at a relatively keen wedge acting angle with respect to the longitudinal axis of the mechanism, and the other shoe and co-operating wedge member of each shoe having engaging faces disposed at a relatively blunt releasing angle with respect to said axis, and each of the keen faced wedge members having frictional engagement with one of the blunt faced wedge members, the engaging surfaces of said last named members being slightly inclined to the longitudinal axis of the mechanism; and means yieldingly opposing movement of said wedge members and friction shells.

18. In a friction shock absorbing mechanism, the combination with front and rear follower elements having longitudinally disposed friction surfaces thereon, said follower elements being relatively movable toward and away from each other; of a friction system co-operating with said elements, said system including a pair of friction shoes and a pair of wedge elements co-operating with the shoes, said wedge elements having inter-engaging faces inclined with respect to the longitudinal axis of the mechanism, said shoes being engaged and moved relatively to each other by said follower element; and spring means interposed between each follower and the friction system.

19. In a friction shock absorbing mechanism, the combination with front and rear follower members having longitudinally disposed friction surfaces, said follower members being relatively movable toward and away from each other; of a friction system co-operating with said members, said system including friction shoe elements and wedge elements co-operating with the shoe elements, said shoe elements and wedge elements being arranged in sets having co-operating wedge faces, one of the elements of each set being engaged by one of said followers and movable in unison therewith to effect movement longitudinally of the mechanism of the co-operating element having wedging engagement therewith, the wedge elements movable with the respective followers having interengaging friction surfaces extending longitudinally of and inclined with respect to the longitudinal axis of the mechanism; and spring resistance means interposed between the friction system and each follower member.

In witness that I claim the foregoing I have hereunto subscribed my name this 13th day of November, 1925.

JOHN F. O'CONNOR.